United States Patent [19]
Robertson

[11] Patent Number: 5,337,111
[45] Date of Patent: Aug. 9, 1994

[54] RESPONSIVE LIGHT LOCK FOR A FILM PACKET HOLDER

[76] Inventor: Jeffrey C. Robertson, Eastman Kodak Company, Rochester, N.Y. 14650

[21] Appl. No.: 21,394

[22] Filed: Feb. 23, 1993

[51] Int. Cl.5 .............................. G03B 17/26
[52] U.S. Cl. ...................................... 354/277
[58] Field of Search ............. 354/174, 178, 276, 277, 354/281, 282

[56] References Cited

U.S. PATENT DOCUMENTS

| | | | |
|---|---|---|---|
| 1,158,902 | 11/1915 | Donald | 354/282 |
| 2,628,545 | 2/1953 | Kurnick et al. | 354/174 |
| 3,899,337 | 8/1975 | Nestor, Jr. | 354/178 |
| 3,953,870 | 4/1976 | Stolper | 354/277 |
| 4,126,465 | 11/1978 | Nel | 354/178 |
| 4,181,418 | 1/1980 | Fechtner et al. | 354/277 |
| 4,413,896 | 11/1983 | Bauer | 354/277 |
| 4,616,914 | 10/1986 | Buelens et al. | 354/277 |
| 4,821,054 | 4/1989 | Armbruster et al. | 354/282 |
| 4,821,055 | 4/1989 | Loose et al. | 354/282 |

*Primary Examiner*—Michael L. Gellner
*Assistant Examiner*—J. K. Han
*Attorney, Agent, or Firm*—Clyde E. Bailey

[57] ABSTRACT

A light lock (10) for a film packet holder (12) provides opposing upper and lower light lock members (32,34) that are urged into contact with opposite exterior surfaces of the film packet 12 after a film packet clip (30) has moved into the holder beyond a point where the light lock (10) defines a closed position. Thus the light lock members (32,34) are only separated by the film packet at the closed position. The light lock members (32,34) are withdrawn from light blocking contact prior to the passage of the clip (30) during film packet removal.

11 Claims, 4 Drawing Sheets

RESPONSIVE LIGHT LOCK FOR A FILM PACKET HOLDER

FIELD OF THE INVENTION

This invention relates to a light lock for a film holder for use with a film packet.

BACKGROUND OF THE INVENTION

A film packet for daylight handling of photosensitive film and a cooperating film holder are disclosed in U.S. Pat. Nos. 4,821,054 and 4,821,055. The packet has film removably attached to a carrier. At one end the carrier has an asymmetrical tab bearing adhesive material, and at its opposite end has a transverse light-locking element. Telescopically receivable over the carrier and film is a light-shielding envelope. The envelope has an open end that is closeable by engagement with a light-locking element, and has a closed end with a sealing area that overlies and, when grasped, adheres to the tab to prevent inadvertent separation of the envelope from the carrier. An adjacent area not overlying the tab is graspable for pulling the sealing area free of the tab and for pulling the envelope away from the film to permit intended exposure. The packet is slidably insertable into and withdrawable from the cooperating holder which includes a spring-loaded pressure-applying member for maintaining the film in an exposure plane and a spring-loaded latching member engageable with the light-locking element to retain the carrier in place. U.S. Pat. Nos. 4,616,914; 4,413,896; 4,181,418; 4,126,465; 3,953,870; 3,899,337; 2,628,545 and 1,158,902 disclose other film holders, film packets and light locks.

In a film holder such as is disclosed in U.S. Pat. No. 4,821,055 for use with film packets of the type disclosed in U.S. Pat. No. 4,821,054, there is a difficulty in providing adequate light protection for the sensitized photographic film in the packet during the time that the covering envelope is withdrawn for exposure of the film. The opening in the end of the holder must be sufficiently wide to allow the metallic clip at the end of the film carrier to pass freely into and out of the holder for loading and unloading while maintaining adequate contact between the light lock material surfaces and the film packet envelope to prevent light from entering the holder during the film exposure portion of the usage cycle. The holder provides a mildly serpentine path for the clip to travel over the first light lock strip, then under the second light lock strip, by separating the two light lock strips in the direction of clip travel.

Ideally, the stiffness of the envelope results in adequate contact between opposite exterior surfaces of the envelope and the corresponding light lock strip to prevent light from entering the holder. Unfortunately, the mildly serpentine path does not allow for distortion or displacement of the envelope by the user as the user attempts to withdraw the envelope to the 'expose' position and as the user returns it to the closed position after film exposure. Accordingly, it will be appreciated that it would be highly desirable to have a film packet and film holder which allow for the distortion and displacement of the envelope by the user during normal operation.

SUMMARY OF THE INVENTION

The present invention is directed to overcoming one or more of the problems set forth above. Briefly summarized, according to one aspect of the present invention, a light lock is provided for a film holder. The film holder has top, bottom and rear wall, and a front wall with an opening for receiving film in a film packet. The film packet has an envelope with one end of the envelope held closed with a clip to prevent ingress of light to the photosensitive film within the envelope. The film is partially removable from the envelope after insertion of the film packet into the film holder by sliding the envelope while leaving the clip attached to the film. The light lock comprises an upper light lock member attached to the top wall inside the film holder near the opening in the front wall; a mounting member having upper and lower springs and an extension arm with the springs and extension arm attached to one another at a junction; and a lower light lock member attached to the extension arm with the upper and lower springs riding on the top and bottom walls, respectively, so that the lower light lock member pivots with the extension arm between an open position at which the lower light lock member is spaced from the upper light lock member and the film packet is free to pass therebetween and a closed position at which the lower light lock member is in close proximity to the upper light lock member to prevent ingress of light. The light lock members are separated only by the film packet at the closed position. The film packet separates the upper spring from the top wall as the film packet is inserted into the film holder and the upper spring rides on the film packet.

According to another aspect of the invention, the light lock comprises an upper light lock member attached to the top wall inside the film holder near the opening in the front wall; a mounting member having an upper spring, a lower return spring and an extension arm with the springs and extension arm attached to one another at a junction; and a lower light lock member attached to the extension arm with the upper spring spacing the mounting member from the top wall and the return spring deforming against rear wall so that the lower light lock member moves with the extension arm between an open position at which the lower light lock member is spaced from the upper light lock member and the film packet is free to pass therebetween and a closed position at which the lower light lock member is in close proximity to the upper light lock member to prevent ingress of light. The light lock members are separated only by the film packet at the closed position.

The light lock includes a ramp member having a ramp and a shoulder at one end of the ramp. The extension arm has a U-shaped portion for holding the lower light lock member and an inclined portion extending from the U-shaped portion and slidably engaging the ramp with the U-shaped portion abutting the shoulder at the open position and moving from the shoulder as the inclined portion slides up the ramp. The inclined portion slides up the ramp in response to insertion of the film packet. During insertion of the film packet, the film packet engages the upper spring and urges the upper spring toward the rear wall causing the inclined portion to slide along the ramp and the lower light lock member to move toward the closed position.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
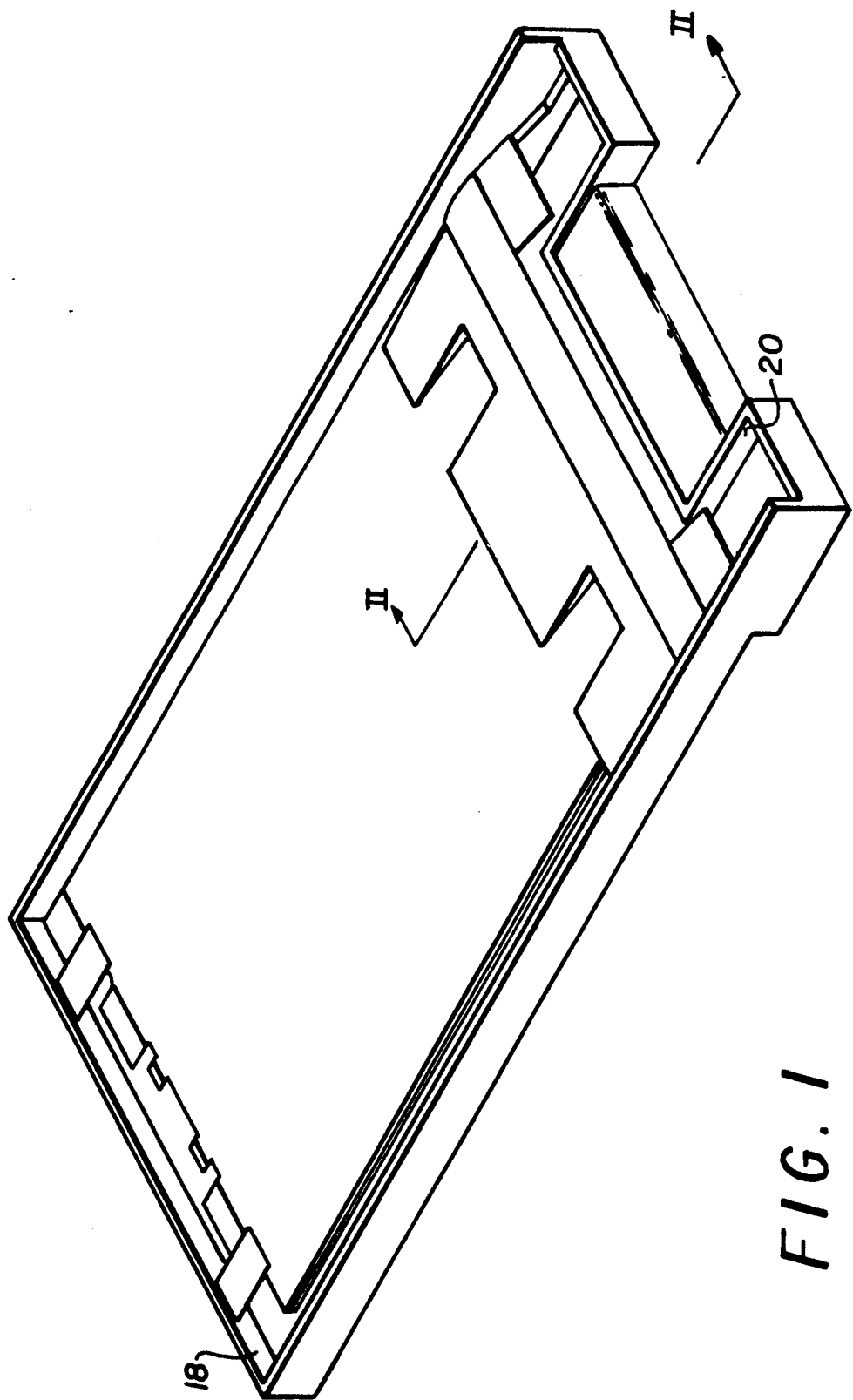
FIG. 1 is a perspective view of a preferred embodiment of a film holder containing a light lock in accordance with the present invention.
Figure 2:
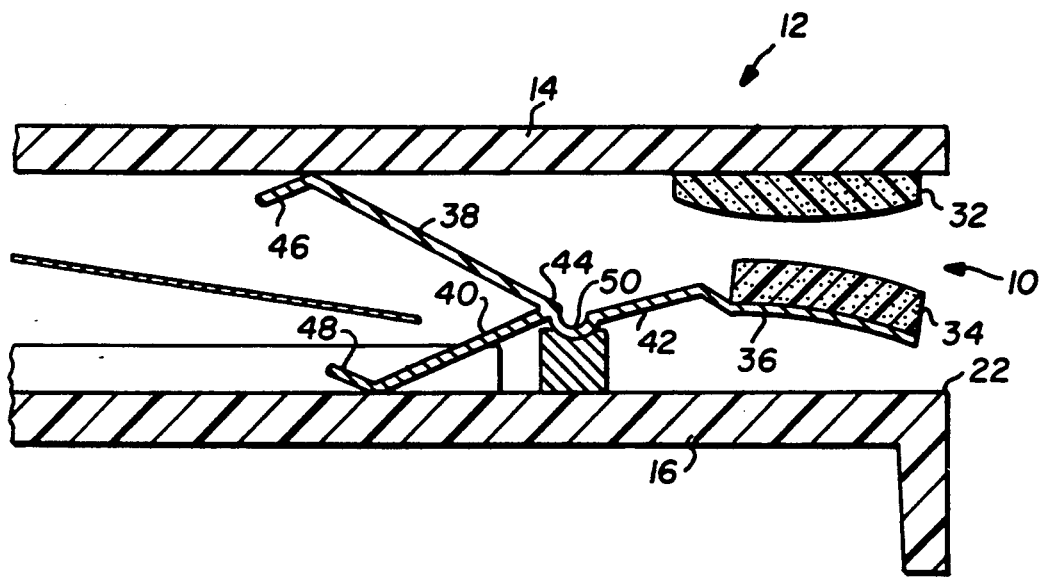
FIG. 2 is a diagrammatic longitudinal partial sectional view taken along line II-II of FIG. 1 illustrating the light lock in an open position.
Figure 3:
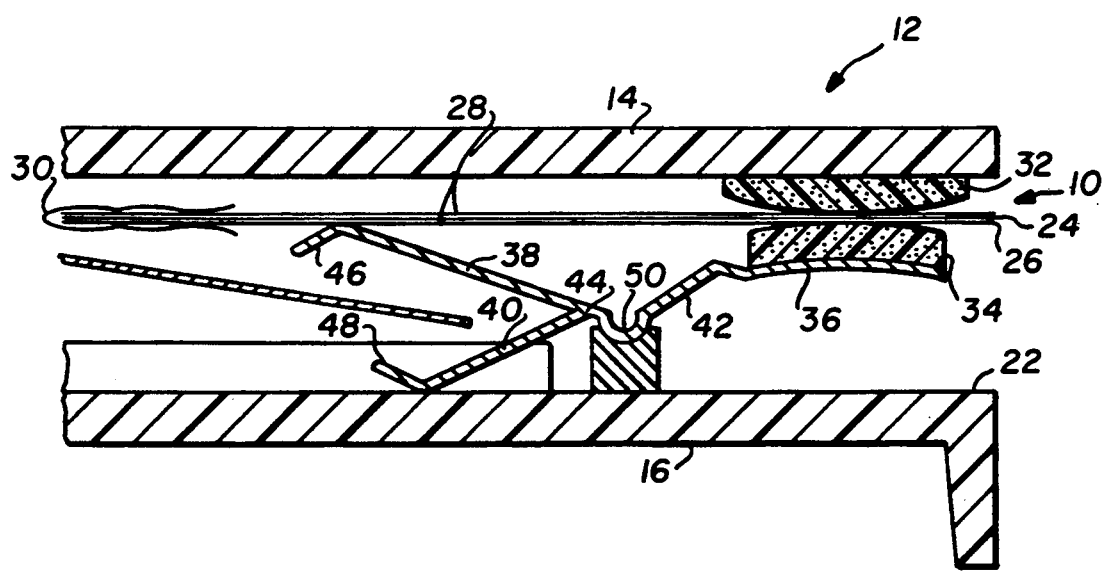
FIG. 3 is a partial sectional view similar to FIG. 2, but illustrating the light lock in a closed position.

Referring to FIGS. 1–3, a light lock 10 is provided for a film holder 12. The film holder 12 has top and bottom walls 14, 16, a rear wall 18, and a front wall 20 with an opening 22 for receiving film 24 in a film packet 26. The film packet 26 and film holder 12 are generally of the type disclosed in U.S. Pat. Nos. 4,821,054 and 4,821,055, the disclosures of which are incorporated herein by reference.

The film packet 26 has an envelope 28 that has one end held closed with a clip 30 to prevent ingress of light to the photosensitive film 24 within the envelope 28. The film 24 is removable from the envelope 28 after insertion of the film packet 26 into the film holder 12 by slidably removing the envelope 28 while leaving the clip 30 attached to the film 24. As disclosed in the prior art, the envelope 28 need not be completely removed from the film 24. It is sufficient to remove the envelope 28 far enough to expose the film 24 for creation of an image.

The light lock 10 includes an upper light lock member 32 that is attached to the top wall 14 inside the film holder 12 near the opening 22 in the front wall 20 of the film holder 12. The upper light lock member 32 preferably has rounded or curved surface for contacting the top surface of the envelope 28 as shown in FIG. 3 where the light lock 10 is in a closed position.

The light lock 10 also includes a lower light lock member 34 that is attached to a mounting member Preferably, the lower light lock member 34 also has a rounded or curved upper surface for contacting the bottom surface of the envelope 28. The mounting member 36 has an upper spring 38, a lower spring 40 and an extension arm 42 that is joined to the springs at a junction 44. The upper spring 38 has a main portion that has a first end portion attached at the junction 44, a second end portion extending toward the top wall 14, and a finger 46 that is attached to the second end portion. In the open position of the light lock 10 as shown in FIG. 2, the finger 46 rides on the top wall 14. The finger 46 is oriented at an angle to the second end portion of the upper spring 38.

The lower spring 40 also has a main portion that has a first end portion attached at the junction 44, a second end portion that extends toward the bottom wall 16, and a finger 48 attached to the second end portion. The finger 48 is oriented at an angle to the second end portion of the lower spring 40 and rests on the bottom wall 16.

The extension arm 42 has a U-shaped portion 50 attached at the junction 44 for providing a pivot for moving the lower light lock member 34 toward the upper light lock member 32 at the closed position illustrated in FIG. 3. At the closed position, the film packet 26 separates the upper spring 38 from the top wall 14 as the film packet 26 is inserted into the film holder t2. In this position, the upper spring 38 rides on the bottom surface of the film packet 26. The spring 38 is resilient and provides a force to urge the light lock members closed.

The lower light lock member 34 is attached to the extension arm 42 and the upper and lower springs 38, 40 ride on the top and bottom walls 14, 16, respectively, so that the lower light lock member 34 with the extension arm 42 moves or pivots between an open position and a closed position. At the open position the lower light lock member 34 is spaced from the upper light lock member 32 and the film packet 26 is free to pass therebetween. At the closed position the lower light lock member 34 is in close proximity to the upper light lock member 32 to prevent ingress of light. The light lock members are separated only by the film packet at the closed position to protect the film 24 from light.

Still referring to FIGS. 1–3, during operation, with the light lock 10 open, the film packet 26 is inserted through opening 22 of front wall 20 of film holder 12. As the film packet 26 is inserted, the clip 30 contacts the upper spring 38 riding on the top wall 14 of film holder 12. As the film packet 26 is further inserted, the upper spring 38 is displaced from the top wall 14 and rides on the bottom surface of the film packet 26. The lower spring 40 maintains its position on the bottom wall 16. The movement of the upper string 38 causes the extension arm 42 to pivot upward moving the lower light lock member 34 with it towards the upper light lock member 32. When the film packet 26 is fully inserted, the light lock members 32, 34 are in close proximity and separated only by the film packet 26. The resilient springs help ensure uniform light blocking contact of the light lock members 32, 34 with the film packet 26. The envelope 28 can be removed to expose the film 24 and reinserted preparatory to removing the film 24 and film packet 26 from the holder 12.

Figure 4:
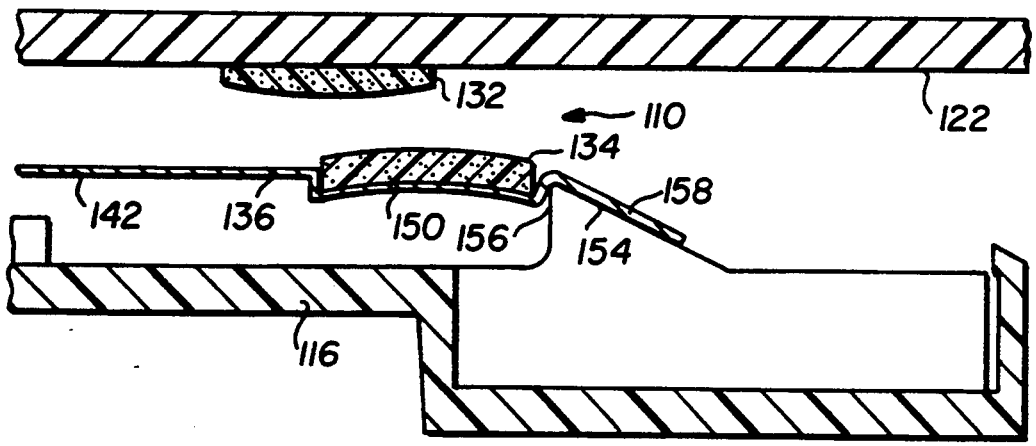
FIG. 4 is a partial sectional view similar to FIG. 2, but illustrating another preferred embodiment.
Figure 5:
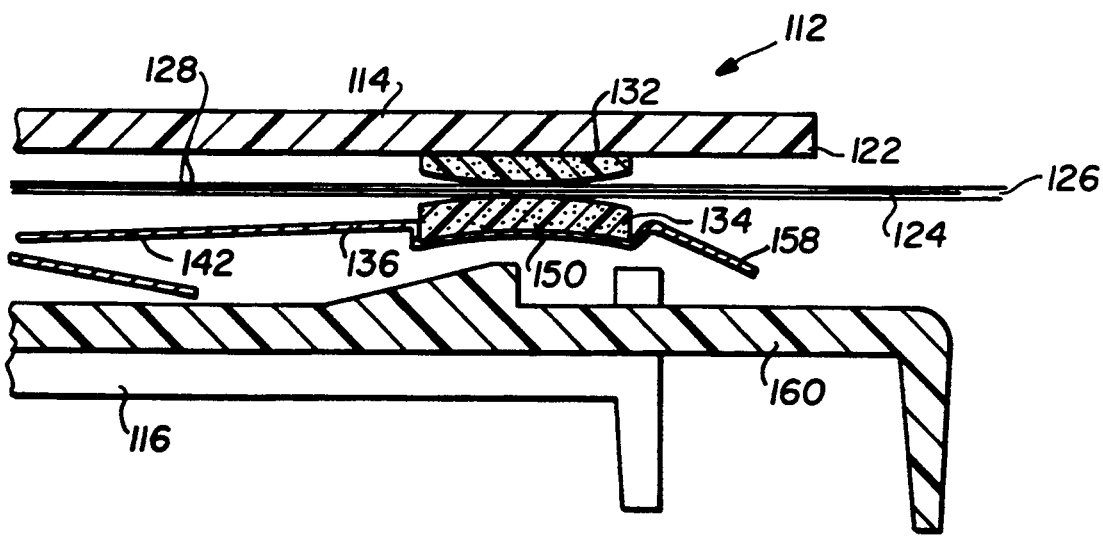
FIG. 5 is a partial sectional view similar to FIG. 3, but illustrating the embodiment of FIG. 4 with a plunger release mechanism.

Referring now to FIGS. 4–7, the light lock 110 includes an upper light lock member 132 that is attached to the top wall 114 inside the film holder 112 near the opening 122 in the front wall of the film holder 112. The upper light lock member 132 preferably has rounded or curved surface for contacting the top surface of the envelope 128 as shown in FIG. 5 where the light lock in is in a closed position.

Figure 6:
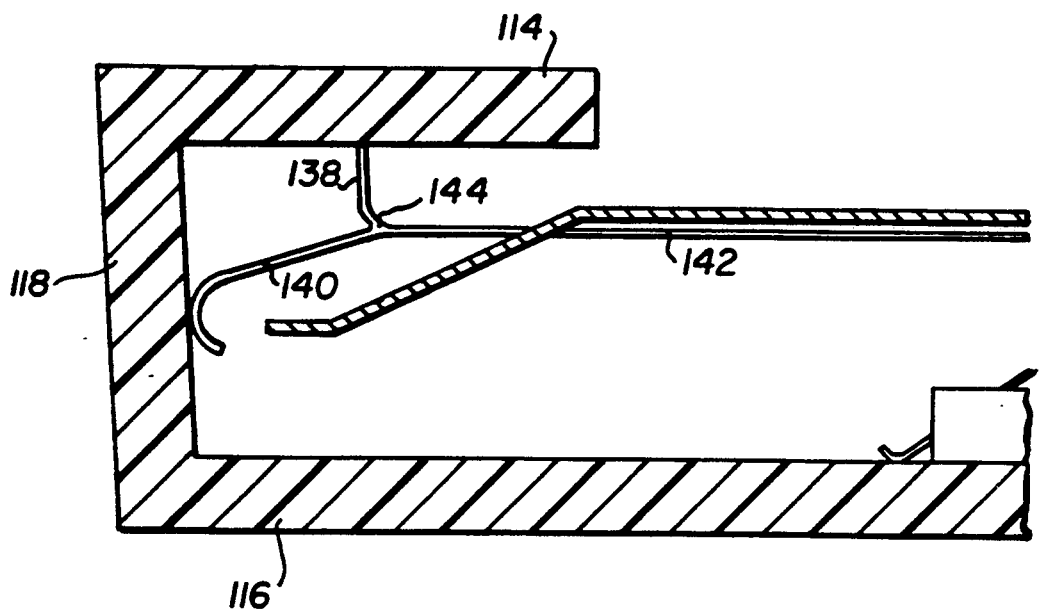
FIG. 6 is a partial sectional view illustrating the return spring for the embodiment of FIG. 4.

The light lock 110 also includes a lower light lock member 134 that is attached to a mounting member 136. Preferably, the lower light lock member 134 also has a rounded or curved upper surface for contacting the bottom surface of the envelope 128. The mounting member 136 has a spacer 138, a lower return spring 140 and an extension arm 142 that is joined to the spacer and spring at a junction 144. The spacer 138 has a main portion that has a first end portion attached at the junction 144 and a second end portion riding on the top wall 114. The spacer 138 spaces the mounting member 136 from the top wall 114 as shown in FIGS. 4 and 6.

Figure 7:
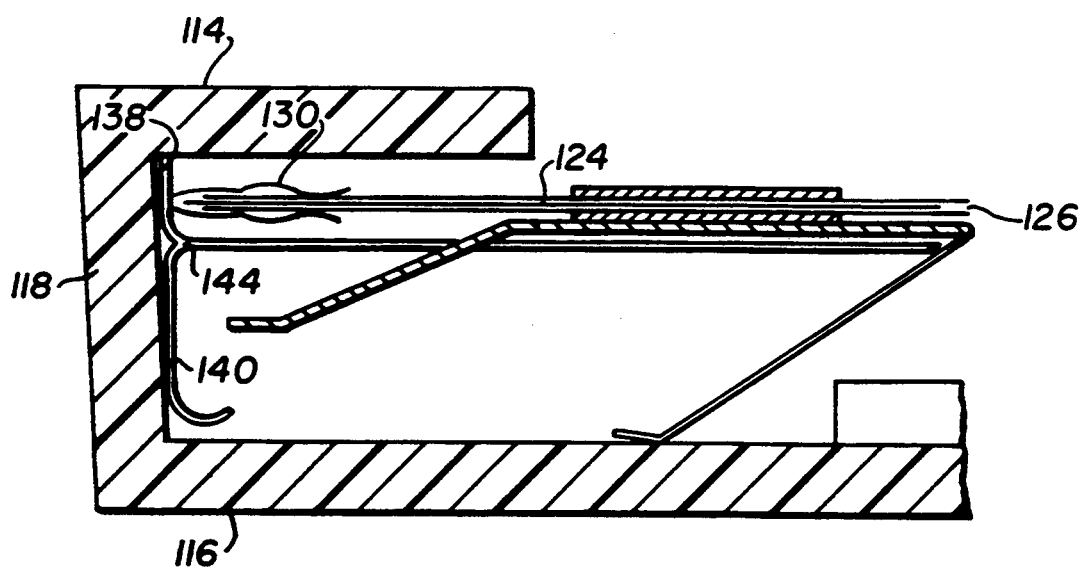
FIG. 7 is a partial sectional view illustrating the return spring for the embodiment of FIG. 5.

The lower spring 140 has a first end portion attached at the junction 144 and a second end portion that contacts the rear wall 118. The second end portion is preferably curved to aid the return spring 140 in deforming against the rear wall 118 so that the lower light lock member 134 moves with the extension arm 142 between the open position (FIGS. 4 and 6) and the closed position (FIGS. 5 and 7).

The extension arm 142 has a cup or U-shaped portion 150 attached opposite the junction 144 for holding the lower light lock member 134. The lower light lock member 134 is attached to the extension arm 142, and the spacer 138 and lower spring 140 ride on the top and rear walls 114, 118, respectively, so that the lower light lock member 134 moves diagonally with the extension arm 142 between an open position and a closed position. At the open position the lower light lock member 134 is spaced from the upper light lock member 132 and the film packet 126 is free to pass therebetween. At the closed position the lower light lock member 134 is in close proximity to the upper light lock member 132 to prevent ingress of light. The light lock members are separated only by the film packet at the closed position.

The diagonal movement is made possible by a ramp member which has a ramp 154 and a shoulder 156 at one end of the ramp 154. The extension arm 142 has a U-shaped portion 150 for holding the lower light lock member 134, and an inclined portion 158 extending from the U-shaped portion 150. The inclined portion 158 engages the ramp 154 and the U-shaped portion 150 abuts the shoulder 156 at the open position (FIG. 4). The inclined portion 158 extends from the U-shaped portion 150 and slidably engages the ramp 154 attached to bottom wall 116 and the U-shaped portion 150 abuts the shoulder 156 at the open position and moves from the shoulder 156 as the inclined portion 158 slides up the ramp 154.

The inclined portion 158 slides up the ramp 154 in response to insertion of the film packet 126. During insertion of the film packet 126, it engages the spacer 138 and urges the spacer 138 towards the rear wall 118 causing the inclined portion 158 to slide along the ramp 156 and the lower light lock member 134 to move towards the closed position (FIGS. 5 and 7).

Still referring to FIGS. 4–7, during operation, with the light lock 110 open, the film packet 126 is inserted through opening 122 in the front wall of film holder 112. As the film packet 126 is inserted, the clip 130 contacts the spacer 138 riding on the top wall 114 of film holder 112. As the film packet 126 is further inserted, the spacer 138 is pushed backwards along the top wall 114 towards the rear wall 118. The lower return spring 140 maintains its deformed configuration against the rear wall 118. The extension arm 142 moves diagonally upward moving the lower light lock member 134 with it towards the upper light lock member 132. This diagonal movement is caused by the sliding action of the inclined portion 158 on the ramp 154. When the film packet 126 is fully inserted, the light lock members 132, 134 are in close proximity and separated only by the film packet 126. The envelope 128 can be removed to expose the film 124 and reinserted preparatory to removing the film 124 and film packet 126 from the holder 112. When the film packet 126 is removed by using the plunger mechanism 160 to release the clip 130, the inclined member 158 slides down the ramp 154 as the return spring 140 regains its original, extended configuration. The sliding motion is stopped when the U-shaped portion 150 again engages the shoulder 156.

It can now be appreciated that there has been presented an improved light lock for a film holder. It provides for opposing pieces of light lock material to be moved into contact with opposite exterior surfaces of the envelope after the clip has moved into the holder beyond the point where the light lock closes. It provides for the withdrawal of the light lock strips prior to the passage of the clip during film packet withdrawal. The light lock renders the film packet and film holder capable of operating even when the envelope is distorted or displaced by the user.

One embodiment of the invention features a pivotally mounted extension arm to which is affixed the lower light lock strip. The pivotally mounted member is located such that the lower light lock strip is positioned opposite the upper light lock strip which is fixedly mounted just inside the film packet opening of the film holder. The pivot axis is beyond the light lock location in the direction of clip travel during packet insertion. Integral spring arms are attached to the pivotally mounted extension arm member and extend beyond the pivot axis. Integral return springs are also attached.

Prior to insertion, the integral return springs cause the pivotally mounted extension arm to rotate to the open position providing sufficient clearance between the light lock surfaces for passage of the film packet clip. As the packet is inserted the clip passes freely through the light lock, then pushes the integral spring arms aside causing the light lock to Divot closed against the envelope. Resiliency of the spring arms allows the spring arms to deflect sufficiently to allow the greatest dimension of the clip to pass, and the envelope surface, in contact with the spring arms, maintains the closed state of the light lock. As the packet is withdrawn after exposure, the spring arms again deflect to allow the clip to pass. As the clip moves off the spring arms, the return springs rotate the light lock to the open position to allow the clip to pass unimpeded.

Another embodiment of the invention utilizes a sliding member which extends to the interior end of the holder under the pressure plate with fingers which project above the pressure plate surface to intercept the clip as it is inserted to its seated latched position. The end of the sliding member adjacent the holder opening has one or more ramps cooperating with ramps on the bottom wall opposite a second strip of light lock material fixedly mounted to the holder front. A return spring urges the slidable member toward the holder opening.

In use, the slidable member is urged toward the opening of the holder by the return spring with the ramp features causing the light lock end of the slide to move diagonally away from the fixed light lock strip allowing sufficient clearance for the free passage of the clip. When the packet has been inserted sufficiently far the fingers at the interior end of the slide are displaced by the clip causing the light lock end of the slide to ride up the ramp features bringing the light lock strips into contact with the packet envelope. Withdrawing the packet after exposure allows the return spring to move the slide toward the open end of the holder causing the light lock surfaces to separate for withdrawal of the clip.

While the invention has been described with particular reference to the preferred embodiments, it will be understood by those skilled in the are that various changes may be made and equivalents may be substituted for elements of the preferred embodiments without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A light lock for a film holder, said film holder having a top wall, a bottom wall, a rear wall and a front wall with an opening for receiving photosensitive film in a film packet, said film packet having an envelope with one end held closed with a clip to prevent ingress of light to the photosensitive film within said envelope, said photosensitive film being partially removable from said envelope after insertion of said film packet into said film holder by slidably removing said envelope while leaving said clip attached to said photosensitive film, said light lock comprising:

an upper light lock member attached to said top wall inside said film holder near said opening in said front wall;

a mounting member attached to said bottom wall inside said film holder, said mounting member having an upper spring, a slower spring and an extension arm, said springs and extension arm being attached to one another at a junction; and a lower light lock member attached to said extension arm, said upper and lower springs riding on said top and bottom walls, respectively, said lower light lock member being pivotable away from said upper light lock member with said extension arm when said film packet is slidably removed from said holder thereby defining an open position at which said lower light lock member is spaced from said upper light lock member and said film packet is free to pass therebetween, and said lower light lock member being pivotable towards said upper light lock member with said extension arm when said film packet is inserted into said holder thereby defining a closed position at which said lower light lock member is in close proximity to said upper light lock member to prevent ingress of light, said upper and lower light lock members being separated only by said film packet at the closed position.

2. A light lock, as set forth in claim 1, wherein said upper spring has a main portion having a first end portion attached at said junction, a second end portion extending toward said top wall, and a finger attached to said second end portion and riding on said top wall.

3. A light lock, as set forth in claim 1, wherein said lower spring has a main portion having a first end portion attached at said junction, a second end portion extending toward said bottom wall, and a finger attached to said second end portion and riding on said bottom wall.

4. A light lock, as set forth in claim 1, wherein said extension arm has a U-shaped portion attached at said junction for providing a pivot point for urging said lower light lock member toward said upper light lock member at the closed position.

5. A light lock, as set forth in claim 1, wherein said film packet separates said upper spring from said top wall as the film packet is inserted into said film holder and said upper spring rides on said film packet.

6. A light lock, as set forth in claim 1, wherein said lower light lock member rotates from the open position to the closed position in response to the presence of said film packet after said clip has passed by said upper light lock member to thereby allow free passage of said film packet.

7. A light lock for a film holder, said film holder having atop wall, a bottom wall, a rear wall and a front wall with an opening for receiving photosensitive film in a film packet, said film packet having an envelope with one end of the envelope held closed with a clip to prevent ingress of light to the photosensitive film within said envelope, said photosensitive film being partially removable from said envelope after insertion of said film packet into said film holder by slidably removing said envelope while leaving said clip attached to said photosensitive film, said light lock comprising:

an upper light lock member attached to said top wall inside said film holder near said opening in said front wall;

a mounting member having a spacer attached to said top wall inside said holder, a lower return spring and an extension arm, said spacer, spring and extension arm being attached to one another at a junction; and a lower light lock member attached to said extension arm, said spacer providing separation of said mounting member from said top wall and said return spring deforming against said rear wall sot hat said lower light lock member moves with said extension arm way from said upper lock light member when said film packet is slidably removed from the holder thereby defining an open position at which said lower light lock member is spaced from said upper light lock member and said film packet is free to pas therebetween, and wherein said lower lock light member moves with said extension arm towards said upper light lock member with said extension arm when said film packet engages said spacer and urges said spacer toward said rear wall in said holder thereby defining a closed position at which said lower light lock member is in close proximity to said upper light lock member to prevent ingress of light, said light lock members being separated only by said film packet at the closed position.

8. A light lock, as set forth in claim 7, including a ramp member having arm and a shoulder at one end of said ramp.

9. A light lock, as set forth in claim 8, wherein said extension arm has a U-shaped portion for holding said lower light lock member and an inclined portion extending from the U-shaped portion, said inclined portion engaging said ramp and said U-shaped portion abutting said shoulder at the open position.

10. A light lock, as set forth in claim 8, wherein said extension arm has a U-shaped portion for holding said lower light lock member and an inclined portion extending from the U-shaped portion and slidably engaging said ramp, said U-shaped portion abutting said shoulder at the open position and moving from said shoulder as said inclined portion slides up said ramp.

11. A light lock, as set forth in claim 10, wherein said inclined portion slides up said ramp in response to insertion of said film packet.

* * * * *

UNITED STATES PATENT AND TRADEMARK OFFICE
CERTIFICATE OF CORRECTION

PATENT NO. : 5,337,111
DATED : August 9, 1994
INVENTOR(S) : Jeffrey C. Robertson It is certified that error appears in the above-indentified patent and that said Letters Patent is hereby corrected as shown below:

On the title page, item [76], delete "Eastman Kodak Company" and "14650"
Column 7, line 28, after "a" delete "slower" and insert --lower--.
Column 8, line 10, after "having" delete "atop" and insert --a top--.
Coumn 8, line 31, after "wall" delete "sot hat" and insert --so that--.
Column 8, line 50, after "member" delete "having arm" and insert --having a ramp--.

Signed and Sealed this

Twenty-fifth Day of October, 1994

Attest:

BRUCE LEHMAN

*Attesting Officer*        *Commissioner of Patents and Trademarks*